June 28, 1955      E. R. SCHMIDT      2,711,752
FLUID FLOW CONTROL SYSTEMS
Filed July 28, 1952
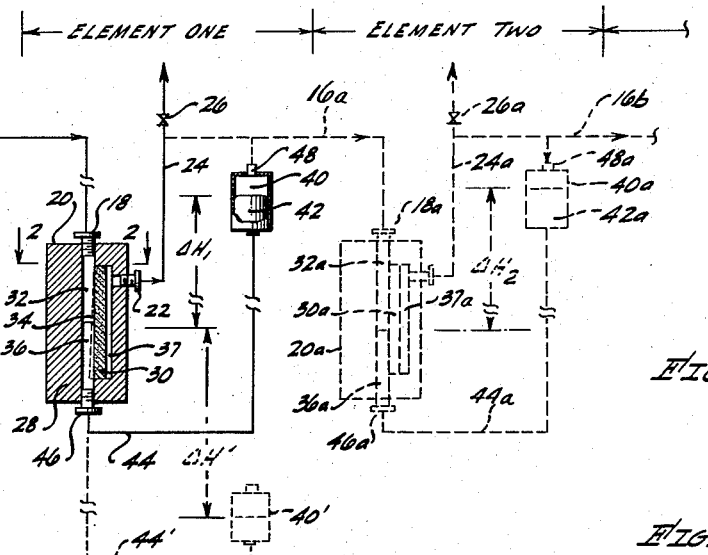
INVENTOR.
ETHAN R. SCHMIDT,
BY
AGENT.

United States Patent Office 2,711,752
Patented June 28, 1955

2,711,752

FLUID FLOW CONTROL SYSTEMS

Ethan R. Schmidt, Fullerton, Calif., assignor to Union Oil Company of California, Los Angeles, Calif., a corporation of California Application July 28, 1952, Serial No. 301,266

14 Claims. (Cl. 137—253)

This invention relates to fluid flow control devices and in particular relates to devices for the control of fluid pressures in systems through which fluids are flowing. Specifically, this invention relates to a device for the regulation and control of back pressures, either above or below atmospheric, in systems through which fluids are passed and in which it is desirable to maintain the operating pressure within relatively narrow limits.

There are many processes and systems which are operated under pressure or vacuum and in which relatively close control of the particular absolute pressure is highly desirable or essential. Conventional back pressure regulators are available and are widely used to control system pressures to prevent fluctuations in pressure with variations in the fluid flow rate. Such back pressure regulators usually comprise an automatic valve actuated by the system pressure in such a manner that it opens or increases its opening in response to a rise in system pressure thereby allowing fluid to escape which tends to decrease the pressure of the system. Such regulators are widely employed in such processes as the many widely known contacting and treating processes for petroleum refining which are carried out under pressure. Further, such devices are employed to control pressures in the very great number of laboratory operations which are well known.

One of the principal problems encountered in such operations using conventional back pressure devices is the inability of the back pressure device to maintain the back pressure constant under conditions in which the fluid flow tends to vary within relatively wide limits. For example, a conventional back pressure regulator will in most cases adequately maintain a back pressure of 100 pounds per square inch gauge when the fluid flow rate does not vary more than about 5%. Many systems are operated in which close control is desired in the face of fluid flows which may vary one hundredfold or more and in which cases conventional back pressure regulators are totally inadequate.

It is therefore a primary object of this invention to provide a device which permits very close pressure control regardless of the absolute pressure in systems in which wide variations in fluid flow are encountered.

It is an additional object of this invention to provide a back pressure regulator which will maintain a back pressure constant within 1 to 5 millimeters of mercury regardless of the absolute pressure while passing a flow of fluid which varies as much as one hundredfold or more.

Other objects and advantages of this invention will become apparent to those skilled in the art as the description and illustration thereof proceeds.

Briefly, the present invention comprises a back pressure regulation device in which a fluid flow, which is widely variable and flows from the system in which the pressure is to be controlled, is passed through a fluid permeable solid mass and in which the cross-sectional area of the permeable mass which is open to fluid flow is variable by means of a movable column of liquid, to which the fluid permeable mass is impermeable under conditions of operation, and in which with changing fluid pressures the liquid column moves exposing a greater or lesser area of the fluid permeable mass for fluid flow and causing a correction in the system pressure. By inclining the fluid permeable mass so that a nearly horizontal, yet slightly inclined area thereof open to fluid flow is provided, the rise and fall of the liquid column causes only a very slight change in "hydrostatic" head of the liquid column on the system and still provides a widely variable cross-sectional area of the permeable mass for fluid flow.

In operation a sufficient area of the fluid permeable mass is exposed to permit the normal flow of fluid through the system to be controlled. An equivalent absolute pressure is applied by means of a liquid column connected with a liquid reservoir which is elevated with respect to the fluid permeable mass for superatmospheric pressures and disposed below the device for subatmospheric pressures as shown below. The movable column of liquid moves against the face of the fluid permeable mass. Under conditions of increased fluid flow in the system and a tendency toward an increase in pressure, the movable liquid column is moved thereby exposing an increased cross-sectional area of the fluid permeable mass open to fluid flow, permitting an increased fluid flow and rapidly reducing the pressure to the predetermined value. The cross-sectional area open to fluid flow may be made variable between extremely wide limits without requiring substantial changes in the hydrostatic head of the movable column of liquid and against which the flowing fluid in the system acts.

The present invention will be more clearly understood by reference to the accompanying drawings in which:

Figure 1 is a schematic diagram of the device and the system in which it is used for superatmospheric pressure control and which also shows in dotted lines the means for controlling subatmospheric pressures and also the means for connecting these devices in series to obtain relatively high back pressures without the necessity of employing the tall structures usually required to support high liquid columns for applying high hydrostatic pressures.

Figure 2 is a cross section of the modification of the back pressure device shown in Figure 1, Figures 3 and 5 are detailed longitudinal views in cross section of two other modifications of this invention, Figures 4 and 6 are detailed transverse views in cross section of the devices shown in Figures 3 and 5 respectively.

Figure 7 is a detailed view in cross section of the device of this invention provided with a check valve for the movable column of liquid and also showing the device in its inclined form whereby exceedingly low changes in pressure in the system to be controlled operates the back pressure regulator within wide fluid flow limits, and Figure 8 is a detailed view in cross section of the sealed connectors employed to handle the flowing fluids in the device of this invention.

Referring now more particularly to Figure 1, a vessel 10 is shown in which any given process employing a flowing fluid is effected under conditions in which it is desired to obtain close control of the operation pressure. Flowing fluids are admitted through line 12 controlled by valve 14 to vessel 10. The effluent fluids from vessel 10 pass through line 16 into the inlet connector 18 of the back pressure regulator device of this invention indicated generally as 20. The effluent fluids are removed from device 20 through connector 22 and line 24 provided with valve 26 and are disposed of or subjected to further processing not shown.

Back pressure regulator device 20 consists of the device body 28 in which is mounted a fluid permeable mass 30. An inlet chamber 32 is provided along one side of the fluid permeable element exposing inlet face 34 thereof and against which the movable column 36 of liquid rises and falls. Inlet connector 18 opens into inlet chamber 32 whereby the fluid flow from system 10 is admitted.

An outlet manifold 37 is provided along the opposite face of the fluid permeable mass 30 into which the flowing fluids discharge after passage through the fluid permeable element. These fluids are collected therein and passed through connector 22 for subsequent handling.

The fluid permeable element is selected so that it is substantially impermeable to the liquid employed in column 36. The liquid employed in the moving column is preferably mercury because of its high density and relative inertness, but other dense liquids may be employed provided they do not wet the permeable element. Liquids such as molten salts, molten metals such as lead, and the low melting point alloys such as Wood's metal and Rose's metal, and the other well-known alloys of bismuth, antimony, lead, tin, etc. may be used. In some cases, other high density liquids are applicable such as the heavily halogenated lower molecular weight hydrocarbons such as carbon tetrachloride (density 1.6), carbon tetrabromide (density 3.42), carbon tetraiodide (density 4.32) and any other dense liquids which are liquid at temperature and pressure of the system.

It is essential that none of the liquid in the liquid column pass through the permeable element of this device. Liquid can be forced under high differential pressures through the permeable element and also will pass through if the liquid "wets" the permeable element. The maximum differential pressure at which liquid flow begins (called the "displacement pressure") is a function of the interfacial tension of the liquid and the fluid being handled ($\gamma$ in dynes per centimeter), the contact angle ($\theta$ in degrees) and the radius of the larger pores in the permeabl element ($r$ in centimeters) and is expressed approximately by the following equation:

$$\Delta P_{max} = \frac{2\gamma \cos \theta}{r}(1.45 \times 10^{-5})$$

The pressure differential between the inlet chamber and the outlet manifold calculated from this relationship should not be exceeded and the liquid selected must not wet the surface of the permeable element.

A hydrostatic head $\Delta H_1$ is applied by providing an elevated reservoir 40 containing body of liquid 42 which is connected by means of line 44 to connector 46 opening into the bottom of inlet chamber 32. If desired, reservoir 40 may be left open to the atmosphere by means of opening 48 in which case the absolute pressure on the system 10 is that equivalent to atmospheric pressure plus $\Delta H_1$. If desired, a constant applied pressure may be maintained in reservoir 40 in which case the absolute pressure on system 10 is atmospheric plus that applied to the reservoir 40 pressure plus $\Delta H_1$.

Shown below device 20 in broken lines is reservoir 40' connected to the back pressure regulator device by line 44'. Reservoir 40' is disposed at an elevation below liquid column 36 and permits control of subatmospheric pressure in system 10. The absolute pressure in system 10 will be atmospheric pressure minus $\Delta H'$. Outlet line 24 is in the subatmospheric pressure control modification connected to a vacuum pump, jet ejector or other means for generating a low pressure.

It is possible by connecting the devices described above in series to multiply the pressure applied to system 10 very greatly over that equivalent to that of $\Delta H_1$ and yet eliminate the lengthy hydrostatic columns usually required. Such a system is shown in Figure 1, being indicated therein in dotted lines. It should be understood that the system may comprise 3, 4, or many more of such serially connected back pressure regulator devices described above, but only one additional member of such a series is here shown for reasons of simplicity. In all cases, the elements referred to are identical to and operate the same as those elements described above.

A second back pressure regulator device 20a is provided with its inlet 18a connected by means of line 16a to outlet 48 of reservoir 40 and fluid outlet line 24. In this operation, valve 26 is closed and the outlet fluids from back pressure regulator device 20 flow directly into inlet chamber 32a of device 20a. An additional hydrostatic head $\Delta H_2$ is applied by providing reservoir 40a containing additional liquid 42a which communicates through line 44a with inlet 46a providing liquid column 36a. The fluids introduced through line 16a discharged through a fluid permeable mass, not shown but analogous to element 30, into an outlet manifold analogous to element 36 and are removed through line 24a provided with valve 26a and are discharged. Line 16b is shown connecting outlet line 24a with inlet opening 48a for the provision of further back pressure regulator devices in the event that a back pressure greater than $\Delta H_1$ plus $\Delta H_2$ is desired.

Variations in total applied pressure to system 10 may be obtained by raising and lowering the elevation of the last reservoir in the series, here reservoir 40a.

In the combination system described above, liquid columns 36 and 36a and any further liquid columns in the series move back and forth across the inlet faces of the fluid permeable elements 30 and 30a to expose lower and greater cross-sectional areas to fluid flow while applying a back pressure on the system to be controlled by means of one or more hydrostatic columns of liquid. The fluid flowing from system 10 passes serially through the plurality of elements of the series in a manner analogous to that described in connection with elements 1 and 2 in Figure 1.

In Figure 2 is shown a cross section of device 20 of Figure 1. In Figure 2, body 28 is shown provided with inlet chamber 32 and fluid permeable element 30. Manifold 36 consists of an open passageway along the outlet or downstream side of permeable element 30 from which outlet 22 opens.

In this modification of the device, the permeable element comprises a part of a cylinder formed from the permeable material and provided with an opening drilled or otherwise formed along the longitudinal axis thereof. Thus, as the liquid column rises and falls, a lesser or greater area on the inlet face or inside surface 34 of the permeable element is exposed for fluid flow radially therethrough into outlet manifold 36.

Referring now to Figures 3 and 4, which show respectively a longitudinal cross section and a transverse cross section of a modified form of the back pressure regulator device, body 50 is shown in cylindrical form. A longitudinally disposed inlet chamber 52 is centrally located within the cylindrical body 50 and is immediately surrounded by an annular shaped mass 54 of the fluid permeable material. Surrounding this permeable material is a supporting structure or backing material 56 which is of relatively high permeability compared to the permeability of fluid permeable material 54. A suitable material is Aloxite which is a highly permeable aluminum oxide made by the Carborundum Company. The purpose of the relatively high permeability backing element 56 is twofold; first, to provide support for resisting the internal pressure acting radially through permeable mass 54 from inlet chamber 56 in which the liquid column rises and falls; and second, to provide an outlet manifold of high permeability to permit the ready removal of fluids penetrating the relatively low permeability fluid permeable mass 54. In this latter respect it is substantially equivalent to an open outlet manifold. An outlet opening 58 opens from outlet manifold 56 through which the fluids are withdrawn.

As is clearly noted in Figure 4, elements 54 and 56 are actually sectors of cylinders and the radial fluid flow from inlet chamber 52 progresses therefrom throughout about 300° of a complete circle into outlet manifold 56. Thus, a view of the liquid column 60 may therefore be had when the material from which device body is fabricated is a transparent material such as glass or plastic. In devices according to this invention construction for extremely high pressures, the plastic body may be surrounded by a pressure resistant shell, not shown, but provided with a high pressure viewing window analogous to those used in high pressure liquid gauges to permit viewing of the liquid column.

In the modification shown in Figures 3 and 4, the increase in area open to fluid flow through relatively low permeability permeable mass 54 is inversely proportional to the height of the liquid column standing in inlet chamber 52. In Figures 1 and 2, due to the inclined surface 34 of element 30, a cross-sectional area is provided for fluid flow which increases with the depression of liquid column 36 whereby the initial lowering of the liquid column from the uppermost point of element 30 is considerably less than an equal depression of the liquid column near the lowermost point of permeable element 30. Such a configuration permits accurate control of back pressures when the flow rate of fluid is very small as well as when the flow rates are very large.

In Figures 5 and 6 are shown a longitudinal and a transverse cross section of a third modification of the device of this invention in which the length of flow path through the relatively low permeability fluid permeable material is varied to secure the same accuracy of back pressure control in wide flow ranges.

Referring now to Figures 5 and 6, device body 66 is provided with longitudinal inlet chamber 68 in which liquid column 70 rises and falls. Immediately adjacent inlet chamber 68 and column 70 is a wedge-shaped mass of relatively low permeability fluid permeable material 72. This mass is analogous to mass 54 in Figure 3 and mass 30 in Figure 1. When column 70 stands highest in inlet chamber 68 a relatively long flow path $d_1$ is provided having a relatively high resistance to flow. But when greater flows are encountered, column 70 is moved to position 74 providing not only a greater cross-sectional area open to fluid flow but also a considerably decreased length of fluid flow paths $d_2$ adjacent the top of column 70 when at position 74.

Fluid outlet manifold 74 is provided adjacent the relatively low permeability mass 72 and again serves as a backing material as well as a high permeability path for the removal of fluids. These fluids collecting in manifold 74 flow therefrom through outlet opening 76.

Referring now to Figure 7, a modification of the device according to this invention is shown in an inclined position whereby back pressure changes due to the rise and fall of the liquid column within the device may be reduced to substantially zero and yet permit very large changes in cross-sectional area open to fluid flow. Thus, the change in back pressure may be as low as 1 or 2 millimeters of mercury or lower, depending on the density of the liquid in the column, between limits of zero area and the maximum area open to fluid flow. Any of the modifications above described may be inclined to achieve these results.

In Figure 7, device body 80 is provided with longitudinal inlet chamber 82 in which liquid column 84 progresses back and forth across the inlet face of mass 86 which is exposed to fluid flow to a greater or lesser degree depending on the position of liquid level 88. Outlet manifold 90 and outlet opening 92 are also provided and are analogous to those of Figures 1 through 6. Fluids enter through fluid inlet 94 and flow through check valve flow device indicated generally at 96. The fluids enter into and pass through inlet chamber 82, permeable element 86, outlet manifold 90 and are removed by way of outlet opening 92. The purpose of check valve element 96 is to permit the flow of fluids into inlet chamber 82 and prevent the flow of the liquid at column 84 in the reverse direction should the pressure on the system to be controlled decrease from the desired value for one reason or another.

Check valve element 96 consists essentially of fluid permeable check element 98 which is also impermeable to the liquid employed in column 84. If desired, backing elements 100 and 102 of relatively high permeability to all the fluids concerned may be employed to provide mechanical strength to element 96. Such a check valve element may also be used with the modifications shown in Figures 1 through 6 in an analogous manner.

The disposition of the back pressure regulator device on an inclined plane as shown in Figure 6 results in a minimum change in back pressure while permitting a variation in cross-sectional area in element 86 open to fluid flow which may vary within very great limits to permit the passage of extremely wide ranges of fluid flow. Thus, it will be appreciated that this device can successfully maintain substantially constant back pressures on any given system through which fluids are flowing in spite of the wide variation in the flow rate of the fluids.

In Figure 8 is shown a cross section in detail of the connections employed at the fluid inlet and outlet openings of the back pressure regulator devices of Figures 1, 3, 5 and 7 and which has proved unusually effective in withstanding very high absolute pressures. In Figure 8 a portion of the device body 110 is shown provided with an inlet or outlet passage 112. The connecting tube 114 passes through packing nut 116 and as far as possible into medium diameter opening 118. Around tube 114 is provided an O ring seal 120 in threaded largest diameter opening 122 and packing nut 116 is tightened causing O ring seal 120 to seal completely the outer surface of tubing 114 against the inclined surface 124 of device body 110. If desired, anti-extrusion ring 128 and backing ring 129 may be provided between the lower extremity of packing nut 116 and the O ring seal 120 to prevent deformation of the O ring seal under high pressures. In addition, packing nut 116 is threaded radially and provided with set screws 126 to prevent extrusion of tubing 114 from the packing nut and seal under high pressures.

The tubing seal shown in Figure 8 and described above has been tested to pressures as high as 15,000 p. s. i. and above (with ⅛" tubing) and found free from leaks. For pressures up to about 300 p. s. i., the seal is satisfactory without set screws 126, anti-extrusion rings 128 and backing rings 129, e. g. using only O ring 120 and packing nut 116.

In the device of the present invention, it has been found entirely feasible to construct the bodies of this device from plastic materials such as Bakelite, the polyacrylate plastics or other thermoplastic or thermosetting plastics. If desired, however, in specific high pressure applications these plastic materials may be provided with pressure resistant shells, or the devices may be machined from such metals as steel, brass, aluminum, Monel metal, the various stainless steels, and the like.

The relatively low permeability fluid permeable elements 30 (Figures 1 and 2), 54 (Figures 3 and 4), 72 (Figures 5 and 6) and 86 (Figure 7) must be impermeable with respect to the fluid employed as the liquid column in the inlet chambers described. As stated before, the liquid must not wet the permeable material and the displacement pressure must not be exceeded. Obviously the absolute permeabilities of these elements may differ widely and the permeability is selected depending upon the expected magnitude of the fluid flow rate through the system in which back pressure regulation is to be maintained. Further, the cross-sectional area of these elements open to fluid flow is likewise widely variable depending upon the expected flow rate. In addition, these two considerations are dependent upon each other; that is with relatively large flow rates either a relatively large cross-sectional area and a relatively low permeability element or a relatively low cross-section and a relatively high permeability element will give the same range of permissible fluid flow. The design of the fluid permeable element is based upon considerations of the maximum allowable system pressure deviation (fixes the maximum rise and fall of the liquid column), the expected range of fluid flow rate, and other considerations.

It has been found that such materials, as sintered powdered metals, sintered or fritted glass, unglazed porcelain, consolidated diatomaceous earth and the like, which are obtainable with widely differing permeabilities to fluid flow, are satisfactory for use as the fluid permeable elements described above. The selection in turn depends upon the corrosivity of the fluid being handled, the nature and permeability of the liquid employed, the strength of the materials and the expected fluid flow rate.

As shown in the discussion of the drawings, the outlet manifold may be either an unfilled opening in the body of the device or a space filled with a solid material having a relatively high permeability and thus offering no substantial resistance to fluid flow. The mechanical strength of the fluid permeable elements referred to above is thus improved. It has been found that such relatively high permeability materials may comprise a mass of granular material of realtively large particle size such as broken glass, Ottawa sand, Aloxite mentioned above, or other granular materials as well as the relatively high permeability varieties of the materials designated above.

As an example of the device of the present invention, a device was constructed according to the detailed drawing of Figure 1 using a consolidated diatomaceous earth filter for the fluid permeable element 30. The element was 2.0 inches long and the inlet chamber 32 had a diameter of 0.25 inch. The liquid column was mercury and the fluid flowing was air. The maximum exposed area of the permeable element was 2.5 square centimeters. It was found to have a flow rate range of from less than 5 cubic centimeters per hour to 38 liters per hour and under test it was determined that the change in back pressure was less than 1 millimeter of mercury for a fluid flow rate change of from 5 cubic centimeters per hour to 600 cubic centimeters per hour.

As a further example of this device, water containing dissolved salts was employed as the flowing fluid in a system in which an oil field core was to be saturated with this brine at a pressure of 30 p. s. i. It was found again that less than 1 millimeter of mercury back pressure change was possible for flow rates changing from as low as 0.1 cubic centimeter per hour to as high as 110 cubic centimeters per hour.

It should be understood that the device of the present invention is equally applicable to the control of superatmospheric or subatmospheric back pressures on systems in which fluids including gases or liquids, are flowing.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. An apparatus in which fluids flow at variable rates and are maintained at substantially constant pressure which comprises an enclosure adapted to contain a flowing fluid, inlet means for a fluid opening into said enclosure, outlet means for a fluid opening from said enclosure, said outlet means communicating with a pressure regulating means consisting of a plurality of pressure regulating elements, each of said elements comprising in combination a liquid reservoir and a pressure resistant body containing a solid mass impermeable to the liquid and permeable to the fluid, an inlet chamber within said body exposing one surface of said solid mass and provided with a conduit seal at either end, an outlet manifold exposing another surface of said solid mass, a conduit for said fluids communicating said outlet means opening from said enclosure with said inlet chamber, a conduit for liquid communicating said liquid reservoir through a seal with said inlet chamber, a conduit for fluid communicating said outlet manifold through a seal with said liquid reservoir and through a seal with the inlet chamber of the pressure resistant body in the subsequent pressure regulating element, each of said liquid reservoirs being disposed at a different elevation relative to the pressure resistant body with which it communicates so as to apply a hydrostatic head to said body, said fluids flowing from said enclosure successively through the inlet chamber, permeable solid mass, and outlet manifold of each of said pressure regulating elements and discharging from the outlet conduit of the terminal element.

2. An apparatus according to claim 1 wherein each reservoir is disposed above its communicating pressure resistant body so that a superatmospheric pressure equivalent to a plurality of hydrostatic heads is applied to said enclosure.

3. An apparatus according to claim 1 wherein said conduit for said fluids opens into the higher extremity of said inlet chamber and said conduit for liquid opens into the lower extremity of said inlet chamber whereby the level of a body of said liquid moves therein with respect to the permeable solid mass in response to changes in fluid pressure thereby changing the cross-sectional area of said permeable solid mass open to fluid flow to change the rate of fluid flow through said permeable solid mass and change the fluid pressure back to the desired value in balance with said hydrostatic head.

4. An apparatus according to claim 3 wherein the longitudinal axis of said inlet chamber is inclined from the vertical whereby said level of said body of liquid moves with respect to said fluid permeable solid through a minimum elevation change to permit a maximum change in fluid permeable solid mass area open to fluid flow with a minimum change in said hydrostatic head.

5. An apparatus according to claim 1 in combination with a solid material filling said outlet manifold to strengthen said fluid permeable solid mass, said solid material being highly permeable to said fluids relative to said fluid permeable solid mass.

6. An apparatus according to claim 1 wherein said liquid comprises one which does not "wet" the fluid permeable solid mass.

7. An apparatus according to claim 1 in combination with means adjacent said fluid inlet to said inlet chamber adapted to prevent the passage of said liquid body therethrough, said means comprising a fluid permeable solid mass to which said liquid is impermeable.

8. An apparatus for applying a substantially constant pressure to another apparatus through which fluids are flowing which comprises a pressure regulating means consisting of plurality of pressure regulating elements, each of said elements comprising in combination a liquid reservoir and a pressure resistant body containing a solid mass impermeable to the liquid and permeable to the fluid, an inlet chamber within said body exposing one surface of said solid mass and provided with a conduit seal at either end, an outlet manifold exposing another surface of said solid mass, a conduit for said fluids communicating with said inlet chamber, a conduit for liquid communicating said liquid reservoir through a seal with said inlet chamber, a conduit for fluid communicating said outlet manifold through a seal with said liquid reservoir and through a seal with the inlet chamber of the pressure resistant body in the subsequent pressure regulating element, each of said liquid reservoirs being disposed at an elevation relative to the pressure resistant body communicating therewith so as to apply a hydrostatic head thereto, said fluids flowing successively through the inlet chamber, permeable solid mass, and outlet manifold of each of said pressure regulating elements and discharging from the outlet conduit of the terminal element.

9. An apparatus for applying a constant back pressure which comprises in combination a liquid reservoir and a pressure resistant body containing an elongated liquid impermeable fluid permeable solid mass, an elongated inlet chamber within said body extending along the length of and exposing one side surface of said solid mass, sealing means for conduits opening into each extremity of said chamber, an elongated outlet manifold within said body exposing another surface of said solid mass and communicating with said inlet chamber only through said fluid permeable solid mass, a sealed outlet for a conduit from said outlet manifold, a conduit for fluids communicating with said inlet chamber, a conduit for liquid communicating said liquid reservoir with said inlet chamber, a conduit for fluids opening from said sealed outlet from said outlet manifold, said liquid reservoir being disposed at a different elevation relative to said inlet chamber so as to apply the desired hydrostatic head thereto and to maintain within said inlet chamber and against the side of said fluid permeable mass a movable body of liquid which moves along the length of said mass in response to deviations in pressue of said fluid in said inlet chamber from the desired value to expose a variable area of said mass to fluid flow therethrough to maintain said fluid pressure at the desired value.

10. An apparatus according to claim 9 wherein said liquid reservoir is open to the atmosphere and is movable, being adapted to positioning above said inlet chamber to control a superatmospheric pressure and adapted to positioning below said inlet chamber to control a subatmospheric pressure.

11. An apparatus according to claim 9 wherein the outlet manifold is filled with a solid backing material having a high fluid permeability relative to that of said fluid permeable solid mass.

12. An apparatus according to claim 9 wherein said elongated fluid permeable mass has the geometrical shape of a cylindrical sector, said inlet chamber comprises an elongated opening extending substantially along the longitudinal axis of said sector, and said outlet manifold comprises an opening also having the geometrical shape of a cylindrical sector disposed around said permeable mass.

13. An apparatus according to claim 9 wherein said elongated fluid permeable mass has the geometrical shape of a wedge cut from a cylinder and said inlet chamber comprises an elongated opening extending substantially along the longitudinal axis of said cylinder.

14. An apparatus according to claim 9 wherein said fluid permeable mass disposed between said inlet chamber and said outlet manifold is wedge-shaped and disposed so as to provide an increased area of said permeable mass open to fluid flow and a decreased average length of fluid flow path through said permeable mass when increased fluid flows are encountered and said liquid stands at its lower levels in said inlet chamber.

References Cited in the file of this patent

UNITED STATES PATENTS

| | | |
|---|---|---|
| 1,520,583 | Lockhart | Dec. 23, 1924 |
| 1,704,966 | Earl | Mar. 12, 1929 |
| 1,730,408 | Collins | Oct. 8, 1929 |
| 1,821,237 | Rawling | Sept. 1, 1931 |
| 2,075,947 | Kennedy | Apr. 6, 1937 |
| 2,499,024 | Hollyday | Feb. 28, 1950 |
| 2,588,214 | Dawson | Mar. 4, 1952 |
| 2,601,967 | Larsen | July 1, 1952 |

FOREIGN PATENTS

| | | |
|---|---|---|
| 554,516 | Germany | July 9, 1932 |